United States Patent [19]
Uchman

[11] Patent Number: 5,277,660
[45] Date of Patent: Jan. 11, 1994

[54] TRIPOD CONSTANT VELOCITY JOINT WITH CHAIN LINKED ROLLERS

[75] Inventor: Frederick J. Uchman, Clarkston, Mich.

[73] Assignee: GKN Automotive, Inc., Auburn Hills, Mich.

[21] Appl. No.: 996,835

[22] Filed: Dec. 23, 1992

Related U.S. Application Data

[63] Continuation of Ser. No. 830,611, Feb. 4, 1992, abandoned.

[51] Int. Cl.⁵ .................. F16D 3/205; F16C 29/06
[52] U.S. Cl. .................................. 464/111; 384/44; 464/168; 464/905
[58] Field of Search ............... 464/111, 123, 124, 132, 464/905, 168; 384/44

[56] References Cited

U.S. PATENT DOCUMENTS

| | | | |
|---|---|---|---|
| 3,111,350 | 11/1963 | Anderson | 384/44 |
| 3,190,703 | 6/1965 | Thomson et al. | 384/44 |
| 3,398,562 | 8/1968 | Adam | 384/44 X |
| 3,836,211 | 9/1974 | Pfister-Schneeberger | 384/44 |
| 4,505,521 | 3/1985 | Teramachi | 384/44 |
| 4,563,045 | 1/1986 | Katayama | 384/44 |
| 4,565,540 | 1/1986 | Orsin | 464/111 |
| 4,741,723 | 5/1988 | Orain | 464/111 |
| 4,768,990 | 9/1988 | Farrell et al. | 464/111 |
| 4,768,994 | 9/1988 | Stenglein | 464/111 |
| 4,830,516 | 5/1989 | Davenport et al. | 464/111 X |
| 4,840,600 | 6/1989 | White et al. | 464/111 |

Primary Examiner—Daniel P. Stodola
Assistant Examiner—William G. Battista, Jr.
Attorney, Agent, or Firm—Harness, Dickey & Pierce

[57] ABSTRACT

A tripod joint provides unlimited rolling plunge capabilities by using a chain-linked plurality of roller bearings. The roller bearings travel in an endless path around the inner member continuously providing plunging movement of the outer member with respect to the inner member. The angular travel of the joint is accommodated by angular movement of the inner member with respect to an inner roller. This insures that the plurality of roller bearings will maintain a rolling movement with respect to the outer member even when the joint is operated at an angle.

6 Claims, 3 Drawing Sheets

TRIPOD CONSTANT VELOCITY JOINT WITH CHAIN LINKED ROLLERS

This is a continuation patent application Ser. No. 07/830,611, filed Feb. 4, 1992, now abandoned.

BACKGROUND OF THE INVENTION

This invention relates to universal joints. More particularly, this invention relates to a tripod constant velocity joint having chain-linked rollers to provide continuous rolling plunge travel.

Front wheel drive automobiles have a pair of halfshaft assemblies to transmit the power from the vehicle's transaxle to its front wheels. These halfshaft assemblies are normally comprised of two constant velocity joints with an interconnecting shaft connecting the two joints.

One of the constant velocity joints is a fixed joint. This joint has a fixed center of rotation and is capable of articulating to angles of 45° to 50°. This joint is placed at the wheel side of the vehicle. The large angular capacity of the joint allows the front wheels to accommodate steering angles as well as suspension movements.

The other constant velocity joint comprising the halfshaft assembly is a plunge joint. This joint has a movable center of rotation and is capable of angles of 20° to 25°. This joint is placed at the transaxle side of the vehicle. The movable center or plunging capability of this joint compensates for vehicle build tolerances as well as suspension movements and engine vibrations.

The tripod version of the plunging joint is widely used throughout the automotive industry as the joint positioned at the transaxle. While the joint performs acceptably for a majority of vehicles, it is not without its problems. In vehicles which are highly sensitive to noise, vibration and harshness (NVH) issues, the tripod joint can create noticeable and objectionable vibrations.

Tripod joints are comprised of a tulip shaped outer member having an internal cavity, a spider member, three annular rollers and a plurality of needle bearings. The spider member has three radially extending cylindrical trunnions. An annular roller is positioned around each trunnion. A plurality of needle bearings are journaled between the annular roller and the cylindrical trunnion. This arrangement allows free rolling of the annular roller relative to the trunnion. This assembly of the spider member, annular rollers and plurality of needles is disposed within the internal cavity of the outer member.

When the joint is operating at a zero degree angle, any plunging of the joint is accommodated by the rollers rolling against a longitudinal surface of the internal cavity of the outer member. The axial forces generated in the outer member are low due to the free rolling of the annular roller against the longitudinal surface of the outer member.

When the joint is operating at an angle, the plane of the annular rollers becomes skewed relative to the plane of the internal cavity. This skewed relationship inhibits true rolling action of the annular roller and a sliding action is introduced between the annular roller and the wall of the internal cavity of the outer member. As the angle of the joint increases, the amount of sliding also increases. This sliding action of the annular roller against the sidewall of the outer member produces a three per revolution pulsating load. The level of the load increases with the sliding action of the annular roller which increases with an increasing angle. Eventually, this pulsating load will become noticeable and objectionable to individuals riding in the vehicle. This objectionable vibration has been termed "shudder".

Numerous designs of tripods have been developed which attempt to reduce or eliminate this shudder phenomena. Some designs utilize a multi-piece roller system in an attempt to limit the amount of skewing of the roller which is in rolling contact with the outer member. These designs usually consist of an inner roller which rides on the trunnion and an outer roller which rides over the inner roller. A plurality of needle bearings is sometimes present between the inner roller and the trunnion or between the inner roller and the outer roller. These joints have enjoyed a limited amount of success in reducing shudder. Unfortunately due to their complex roller assemblies, internal friction generation and limited ability to reduce shudder, these joints do not always reduce the shudder sufficiently to increase the NVH level of the vehicle to an acceptable level.

Other types of joints have addressed the shudder problem by separating the components within the tripod joint which are responsible for the angular and translational movement. These joints have been termed "triplan" joints. There are two styles of triplan joints, a needle triplan and a ball triplan. The needle triplan utilizes a plurality of needle bearings rolling between two planar surfaces for translational movement. The angular movement is accommodated by matching partial spherical surfaces between two components. The ball triplan utilizes a plurality of ball bearings rolling between two partial cylindrical surfaces for translational movement. The angular movement is also accommodated by mating partial spherical surfaces of two components. While these joints are extremely successful in eliminating shudder they still have their problems. The internal components of the joint are expensive and the amount of rolling plunge available to these joints is only enough to accommodate engine vibrations and minor suspension movements. When larger suspension movements are encountered, the joint accommodates these large movements by reverting to a sliding not rolling action.

Positioning devices have been designed for both the needle and ball triplan joints in order to eliminate or reduce the amount of sliding travel encountered by these joints. While these are successful at expanding the use of these joints, they add to the already high cost and are not capable of eliminating the need for sliding travel in the joint.

Additional joints have been designed which utilize a recirculating plurality of needle bearings. The needle bearings roll between a planar surface on an inner member and a planar surface on the outer member. The inner member is designed to continuously guide the needle rollers in a continuous path around the inner member. This continuous supply of needle bearings between the inner member and the outer member eliminates the limited plunge problems associated with the needle triplan joints. While these joints provide excellent performance in reducing the shudder phenomena, they are complicated and difficult to assemble as well as expensive.

Accordingly, what is needed is a tripod constant velocity joint which provides unlimited rolling plunge while simplifying assembly and reducing costs.

SUMMARY OF THE INVENTION

The present invention provides the art with a tripod constant velocity joint which offers unlimited plunge by using a chain-linked plurality of roller bearings. The roller bearings travel in an endless path around an inner member, continuously providing roller bearings to accommodate translational movement of the inner member with respect to an outer member.

DETAILED DESCRIPTION OF THE PREFERRED EMBODIMENT

Figure 1:
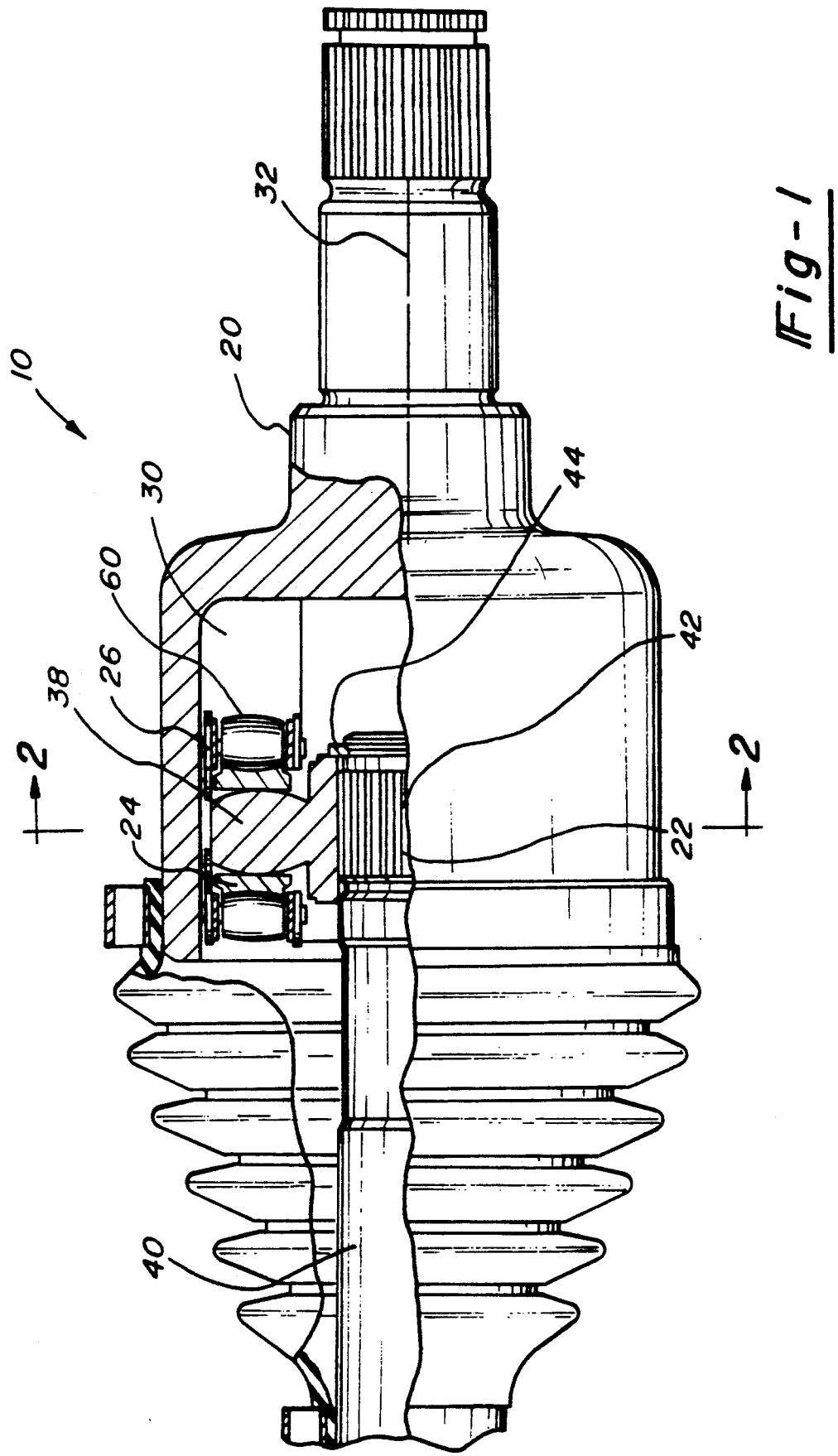
FIG. 1 is a side elevation, partially in cross section of a tripod joint in accordance with the present invention.

A tripod constant velocity joint in accordance with the present invention is shown in FIGS. 1-4 and is designated by the reference numeral 10. The tripod constant velocity joint 10 comprises an outer member 20, an inner member 22, three inner annular rollers 24 and three drive link roller assemblies 26.

The outer member 20 is a tulip shaped housing having an internal cavity 30 and an axis of rotation 32. The internal cavity 30 is generally parallel to the axis of rotation 32. The internal cavity 30 has three circumferentially spaced longitudinally extending lobes 34. The lobes 34 are also generally parallel to the axis of rotation 32. The lobes 34 have oppositely disposed longitudinally extending sidewalls 36. The sidewalls 36 also run generally parallel to the axis of rotation 32 and are shaped to be complimentary to the plurality of roller bearings 60 as will be explained herein.

The inner member 22 has a spider member 38 and a shaft 40. The spider member 38 and shaft 40 may be integral or they may be separate. If they are separate, they are connected by spline means 42 and snap ring 44 as shown in FIG. 1. The inner member 22 has a second axis of rotation 46.

Figure 2:
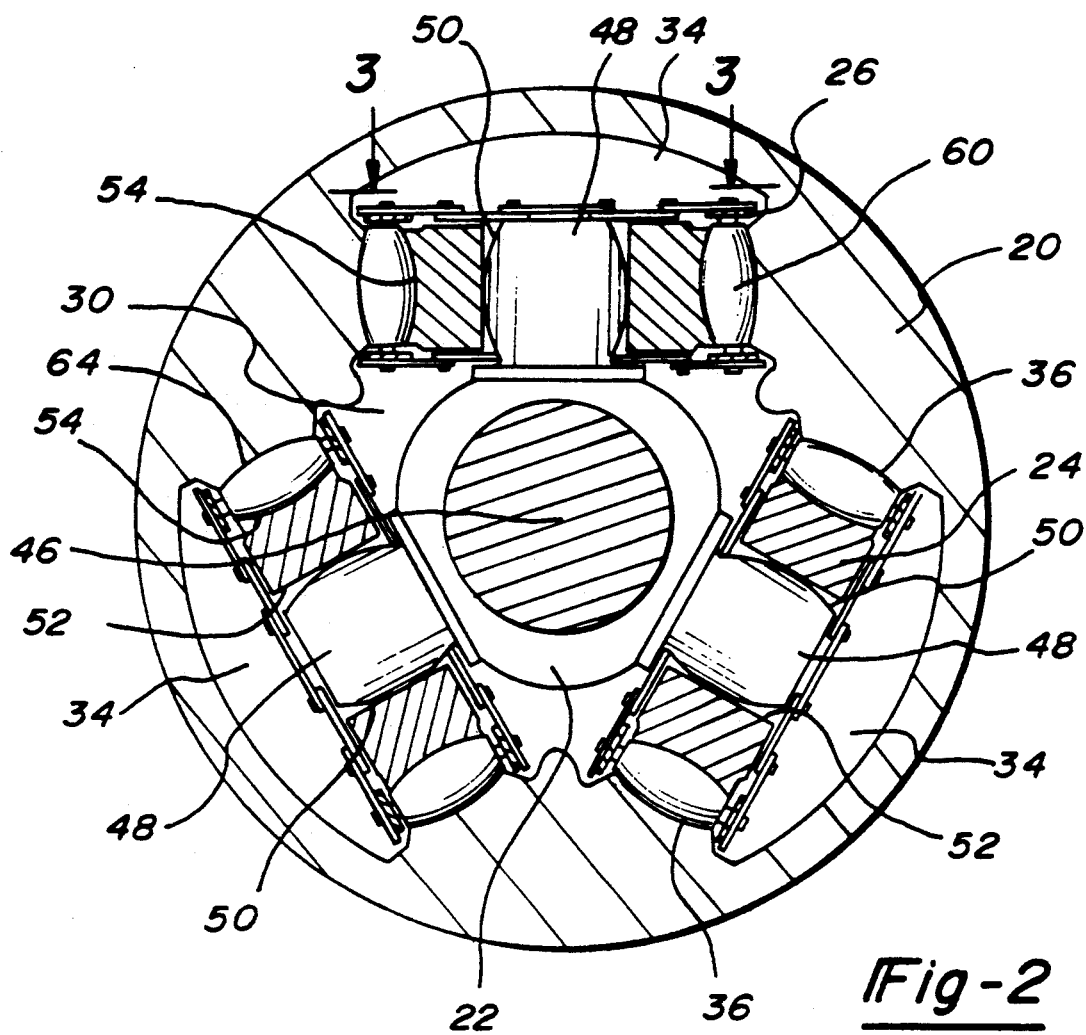
FIG. 2 is a view from FIG. 1 along line 2—2 thereof.

The spider member 38 has three circumferentially spaced radially extending trunnions 48. Each trunnion 48 extends into a respective lobe 34 of the outer member 20 as shown in FIG. 2. The trunnions 48 have a partial spherical surface 50 which extends between the oppositely disposed sidewalls 36 of the outer member 20.

Figure 3:
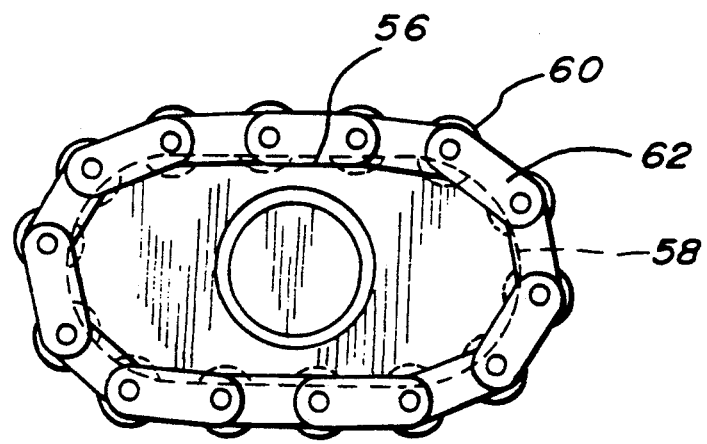
FIG. 3 is a view from FIG. 2 along line 3—3 thereof.
Figure 4:
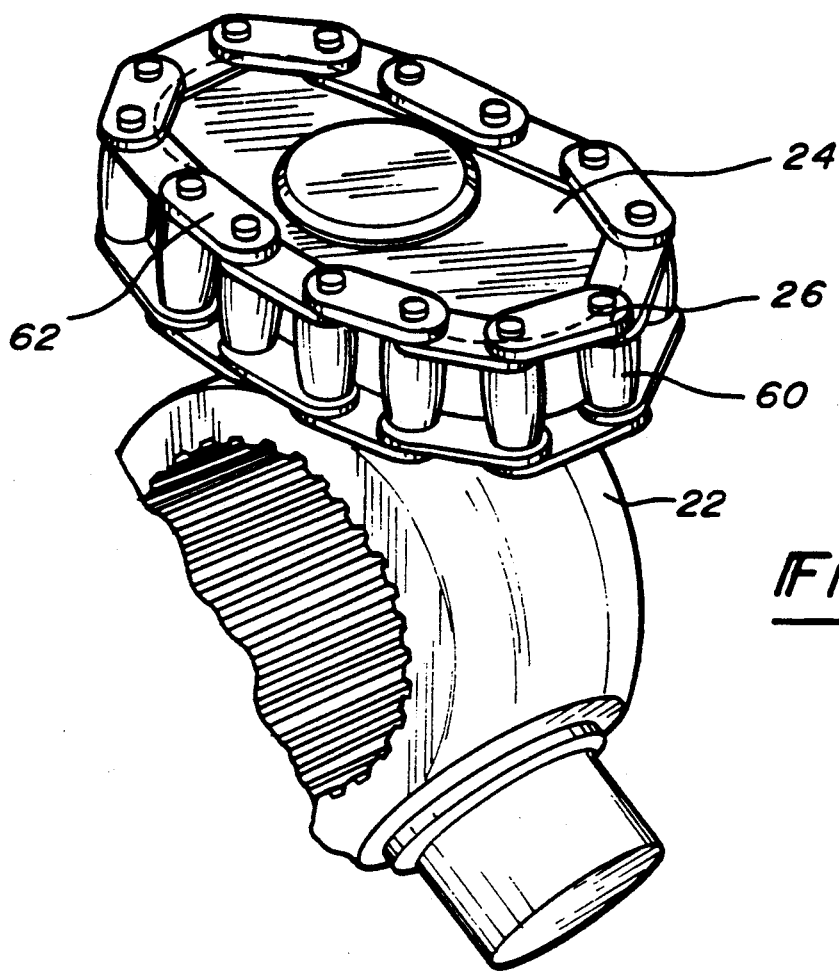
FIG. 4 is a perspective view of the sub-assembly of the inner member, the inner annular roller and the endless link of roller bearings.

Each of the annular rollers 24 surrounds a respective trunnion 48 and has an internal cylindrical surface 52 and an exterior surface 54. The internal cylindrical surface 52 is in sliding contact with the partial spherical surface 50 of the trunnion 48. The exterior surface 54 has a straight portion 56 on each side of the roller 24 connected by a radiused portion 58 as shown in FIG. 3. The contour of the exterior surface 54 of the annular rollers 24 is complimentary to the plurality of roller bearings 60 as will be explained herein.

Each of the drive link roller assemblies 26 surround a respective annular roller 24 and have a plurality of roller bearings 60 and a plurality of linking members 62. The roller bearings 60 have an exterior surface 64 which is in rolling contact with the exterior surface 54 of the respective annular roller 24.

The linking members 62 rotatably unite, by methods well known in the art, the plurality of roller bearings 60 of each drive link roller assembly 26 into an endless chain as shown in FIG. 3. The linking members guide the plurality of rollers in a circuitous route around the exterior surface 54 of the annular rollers 24. The roller bearings 60 traverse from the straight portion 56, to the radiused portion 58, to the opposite straight portion 56 to the opposite radiused portion 58 and so on. While traversing the straight portion 56 the roller bearing 60 is not only in rolling contact with the exterior surface 54 of the respective annular roller 24, it is also in rolling contact the respective sidewall 36 of the outer member 20.

Figure 5:
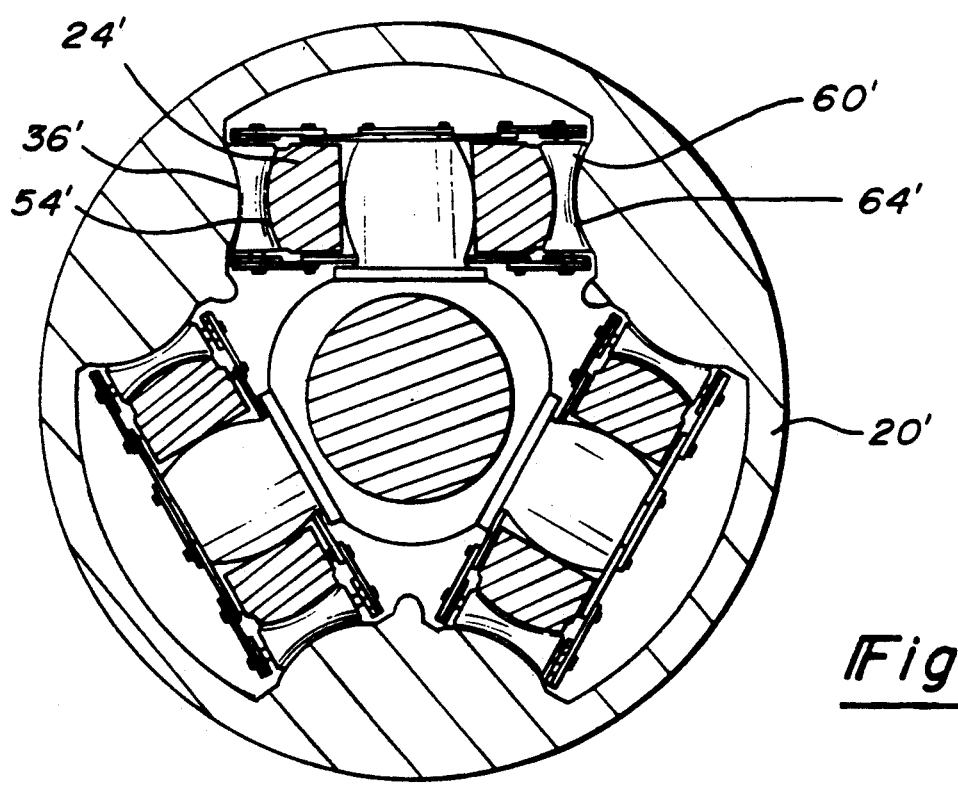
FIG. 5 is a view similar to FIG. 2 showing another embodiment of the present invention.

The contour of the exterior surface 64 of the roller bearing 60 can be a convex curved surface as shown in FIGS. 1-4, or it can be a concave curved surface as shown in the embodiment depicted in FIG. 5. The following description describes the embodiment shown in FIGS. 1-4. Following this description, the embodiment shown in FIG. 5 is described. The reference numbers for the members shown in FIG. 5 will be the same as the reference numbers in FIGS. 1-4 but will be primed for clarification.

When the contour of the exterior surface 64 of the roller bearing 60 is a convex curved surface, as shown in FIG. 2, the contour of the exterior surface 54 of the annular roller 24 is a mating concave curved surface. Likewise, the contour of the sidewalls 36 of the outer member 20 is also a mating concave curved surface.

When the contour of the exterior surface 64' of the roller bearing 60' is a concave curved surface, as shown in FIG. 5, the contour of the exterior surface 54' of the annular roller 24' is a mating convex curved surface. Likewise, the contour of the sidewalls 36' of the outer member 20', is also a mating convex curved surface.

Upon operation of the joint, translational movement of the inner member 22 relative to the outer member 20 is accommodated by the rolling action of the roller bearings 60. The roller bearings 60 roll against the straight portion 56 of the annular roller 24 and against the longitudinal sidewall 36 of the outer member 20. When the roller has traversed the length of the straight section 56, the linking members guide the roller bearings 60 from the straight portion 56 along the radiused portion 58 of the inner member. The roller bearings 60 traverse the radiused length of the radiused portion 58 until they reach the opposite straight section 56 etc. This continuous circulation of the roller bearings 60 around the annular roller 24 provides a continuous rolling plunge movement of the joint.

While the above detailed description describes the preferred embodiment of the present invention, it should be understood that the present invention is susceptible to modification, variation and alteration without deviating from the scope and fair meaning of the subjoined claims.

What is claimed is:

1. A constant velocity universal joint comprising:
    an outer member having a longitudinally extending axial centerline and an internal cavity, said internal cavity having a plurality of circumferentially spaced longitudinally extending lobes, each of said plurality of lobes having a pair of oppositely disposed sidewalls extending generally parallel to said axial centerline;
    an inner member disposed within said internal cavity of said outer member, said inner member having a plurality of circumferentially spaced radially extending trunnions equal in number to the number of said plurality of lobes, each trunnion of said plurality of trunnions having a first exterior bering surface, each trunnion of said plurality of trunnions extending into a respective one of said plurality of lobes between said respective oppositely disposed sidewalls;

a plurality of annular inner rollers, each annular inner roller pivotably positioned around a specific one of said plurality of trunnions, each of said rollers have an interior bearing surface and a second exterior bearing surface, said interior bearing surface in sliding contact with said first exterior bearing surface of said trunnion;

a plurality of arrangements of roller bearings, each arrangement of roller bearings having a plurality of roller bearings, each roller bearing having an axis of rotation and a third exterior bearing surface, said third exterior bearing surface of each roller bearing in rolling contact with said second exterior bearing surface of said respective annular roller, said third exterior bearing surface conforming to both said second external bearing surface of said respective annular roller and said respective sidewall of said outer member in order to position said arrangement of roller bearings parallel to and at a constant radial distance from said axial centerline of said outer member during the operation of said constant velocity joint, said pivotable and sliding contact between said plurality of annular rollers and said trunnions allowing said annular rollers to move radially relative to the inner joint member axis during angulation of said constant velocity joint; and means for linking each roller bearing of each said arrangement of roller bearings into an endless chain such that said roller bearings traverse around said annular inner roller without making contact with other of said roller bearings, each roller bearing rolling longitudinally against said respective sidewall of said outer member when positioned between said respective sidewall and said annular inner roller, said axis of rotation each of said roller bearings remaining generally perpendicular to said respective sidewall due to the conformity between said respective sidewall and each of said roller bearings.

2. The constant velocity joint of claim 1 wherein:

said third exterior bearing surface of each of said plurality of roller bearings is a concave surface having a constant radius of curvature;

said second exterior bearing surface of each of said annular rollers is a convex surface having a constant radius of curvature in mating engagement with said concave surface of each roller bearing of said plurality of roller bearings and;

said respective oppositely disposed sidewalls of said outer member are a convex shape having a constant radius of curvature in mating engagement with said concave surface of each roller bearing of said plurality of roller bearings.

3. The constant velocity joint of claim 1 wherein:

said third exterior bearing surface of each of said plurality of roller bearings is a convex surface having a constant radius of curvature;

said second exterior bearing surface of each of said annular rollers is a concave surface having a constant radius of curvature in mating engagement with said convex surface of each roller bearing of said plurality of roller bearings and;

said respective oppositely disposed sidewalls of said outer member are a concave shape having a constant radius of curvature in mating engagement with said convex surface of each roller bearing of said plurality of roller bearings.

4. The constant velocity universal joint of claim 1 wherein said linking means is a plurality of chain links, rotatably connected to each roller bearing of said plurality of roller bearings.

5. The constant velocity universal joint of claim 1 wherein said first exterior surface of each trunnion of said plurality of trunnions is a curved surface.

6. The constant velocity universal joint of claim 1 wherein said internal bearing surface of each annular roller of said plurality of annular rollers is cylindrical.

* * * * *